(12) United States Patent
Perkins, II

(10) Patent No.: US 10,961,017 B2
(45) Date of Patent: Mar. 30, 2021

(54) CRANE MAT STAND DEVICE

(71) Applicant: RAPTOR TECH, INC., Downers Grove, IL (US)

(72) Inventor: Paul S. Perkins, II, Downers Grove, IL (US)

(73) Assignee: Raptor Tech, Inc., Downers Grove, IL (US)

( * ) Notice: Subject to any disclaimer, the term of this patent is extended or adjusted under 35 U.S.C. 154(b) by 0 days.

(21) Appl. No.: 16/666,356

(22) Filed: Oct. 28, 2019

(65) Prior Publication Data

US 2020/0130889 A1    Apr. 30, 2020

Related U.S. Application Data

(60) Provisional application No. 62/750,976, filed on Oct. 26, 2018.

(51) Int. Cl.
*B65D 19/00* (2006.01)
*B65D 19/38* (2006.01)
*F16M 11/24* (2006.01)

(52) U.S. Cl.
CPC ....... *B65D 19/0004* (2013.01); *B65D 19/385* (2013.01); *F16M 11/24* (2013.01); *F16M 2200/08* (2013.01)

(58) Field of Classification Search
CPC .............. B65D 19/0004; B65D 19/385; F16M 2200/08; F16M 11/24
USPC .................................. 108/55.1, 55.3, 57.12; 312/351.11–351.14
See application file for complete search history.

(56) References Cited

U.S. PATENT DOCUMENTS

| | | | | |
|---|---|---|---|---|
| 3,521,764 A * | 7/1970 | Loomis | ........... | B65D 21/0209 206/386 |
| 4,397,246 A * | 8/1983 | Ishida | ........... | B65D 19/0012 108/55.3 |
| 4,774,892 A * | 10/1988 | Ballard | ........... | B23Q 1/032 108/55.1 |
| 5,868,080 A * | 2/1999 | Wyler | ........... | B65D 19/0022 108/57.25 |
| 5,921,189 A * | 7/1999 | Estepp | ........... | B65D 19/0012 108/57.16 |
| 6,237,509 B1 * | 5/2001 | Ishido | ........... | B65D 19/0012 108/57.25 |
| 6,302,034 B1 * | 10/2001 | Swanson | ........... | B65D 19/44 108/55.1 |
| 7,565,868 B2 * | 7/2009 | Relland | ........... | E02D 27/44 108/51.11 |
| 7,934,885 B2 * | 5/2011 | Fournier | ........... | E01C 9/086 404/35 |
| 8,419,095 B2 * | 4/2013 | McAfee | ........... | B65D 19/38 108/55.5 |
| 8,813,659 B2 * | 8/2014 | Kuo | ........... | B65D 19/38 108/53.1 |
| 9,714,487 B2 * | 7/2017 | Penland, Jr. | ........... | E01C 9/086 |
| 10,046,884 B1 * | 8/2018 | Erschen | ........... | B65G 57/005 |
| 10,086,973 B2 * | 10/2018 | Nussbaum | ........... | B65D 19/0008 |

(Continued)

*Primary Examiner* — Daniel J Troy
*Assistant Examiner* — Timothy M Ayres
(74) *Attorney, Agent, or Firm* — Valauskas Corder LLC

(57) ABSTRACT

A crane mat stand device comprises a base component with integrated moveable support components. The crane mat stand device organizes and stores a plurality of crane mats, minimizes damage to the load or forklift machine, and maximizes safety during transport.

20 Claims, 10 Drawing Sheets

(56) References Cited

U.S. PATENT DOCUMENTS

| | | |
|---|---|---|
| 10,093,521 B2 | 10/2018 | King et al. |
| 10,233,059 B1 * | 3/2019 | Anzola ................... E02D 27/44 |
| 2006/0131305 A1 * | 6/2006 | Clarke ................. B65D 19/385 220/6 |
| 2016/0355993 A1 * | 12/2016 | Tubbs ....................... E04B 5/02 |
| 2019/0283931 A1 * | 9/2019 | Westendorf ........ B65D 19/0002 |

* cited by examiner

CRANE MAT STAND DEVICE

CROSS-REFERENCE TO RELATED APPLICATIONS

This application is a non-provisional application of prior U.S. Provisional Patent Application No. 62/750,976 filed Oct. 26, 2018.

FIELD OF THE INVENTION

The invention relates generally to the field of cranes such as those used in manufacturing, construction and transportation of items. More particularly, the invention relates to a device that organizes and stores a plurality of crane mats and improves safety during transport by an operator.

BACKGROUND OF THE INVENTION

A crane machine, or simply crane, is used to lift and move a load of heavy items. The surface on which a crane machine is positioned is critical for stabilizing the crane. A soft or unlevel surface may destabilize the crane causing it to tip over. Hence, crane mats are used to provide a solid, even surface creating a steady foundation during crane operation. Crane mats additionally distribute concentrated loads. Crane mats are extremely heavy and are usually transported using a forklift machine. Often times a forklift operator positions cribbing under or beneath the load of one or more crane mats to effectively move them. However, this may damage the load or the forks of the forklift machine.

What is needed is a device that organizes and stores a plurality of crane mats. Further, there is a need for a device that minimizes damage to the load or forklift machine and maximizes safety during transport. The invention satisfies these needs.

BRIEF SUMMARY OF THE INVENTION

The crane mat stand device according to the invention organizes and stores a plurality of crane mats and further minimizes damage to the load or forklift machine and maximizes safety during transport.

The crane mat stand device eliminates the need for cribbing under or beneath the load. This may reduce the risk of injury when an operator positions cribbing under or beneath the load for transport, as well as when an operator removes cribbing after the load is transported. This also permits the operator to remain in the forklift machine reducing the exposure for on-site injuries.

The crane mat stand device stores a plurality of crane mats—stacked on each other—keeping them elevated off the ground surface, which may prevent the crane mats from becoming soiled or corroded from moisture.

The crane mat stand device comprises a base platform with integrated moveable support components. When the device is located on a ground surface, the support components are in a first position that protrude from a top surface of the device. In this position, the support components guide the operator in placing each crane mat of the load on the device. When the crane mat stand device is lifted, such as by forks of a forklift machine, the weight of the load (i.e., gravity) causes the support components to travel vertically downward from a first position to a second position such that a portion of the support components protrude from the bottom surface. This allows the crane mat load to transfer from the support components directly to the top surface of the device and furthermore to the forks of the forklift machine. It should be noted that, although the invention is described with reference to a forklift machine, it is contemplated that the crane mat stand device may be transported using a crane machine. Once the crane mat stand device is positioned back on a ground surface, the support components travel vertically upward from the second position to the first position such that a portion of the support components protrude from the top surface.

The crane mat stand device according to the invention reduces the time it takes to transport crane mats and as a result increases productivity.

The invention and its attributes and advantages will be further understood and appreciated with reference to the accompanying drawings.

BRIEF DESCRIPTION OF THE FIGURES

The preferred embodiments of the invention are described in conjunction with the attached figures that illustrate embodiments of the invention.

DETAILED DESCRIPTION OF THE INVENTION

Figure 1A:
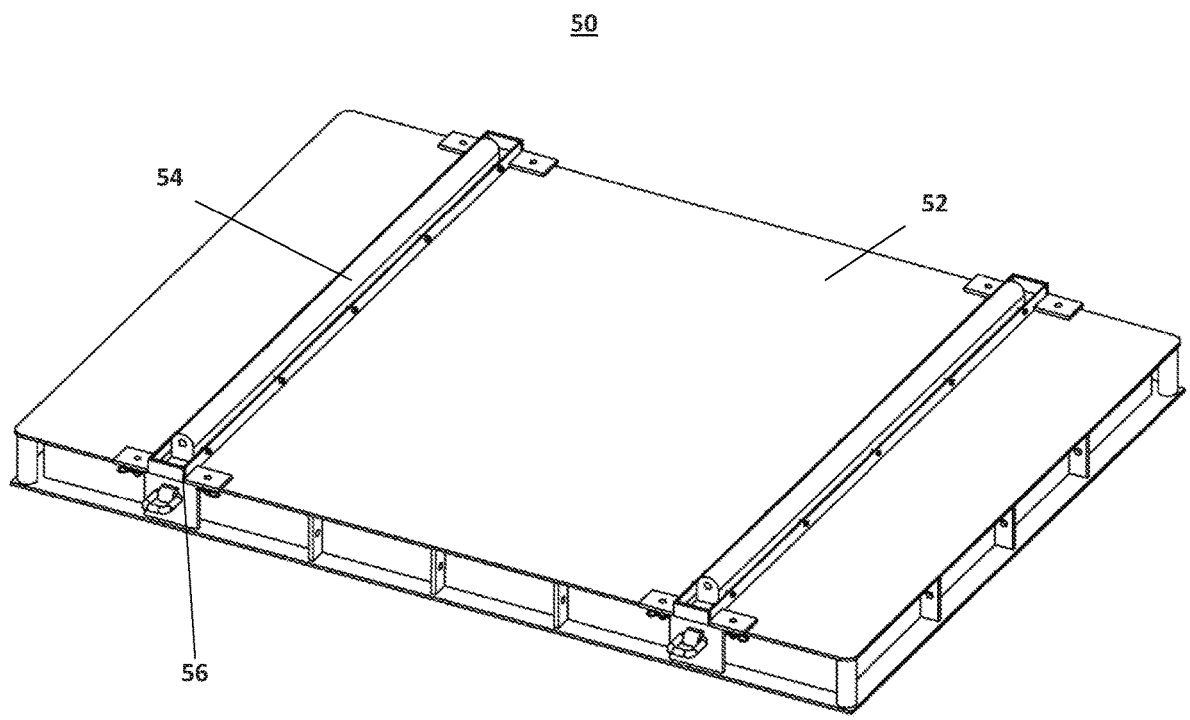
FIG. 1A illustrates a perspective view of an embodiment of a prior art crane mat.
Figure 1B:
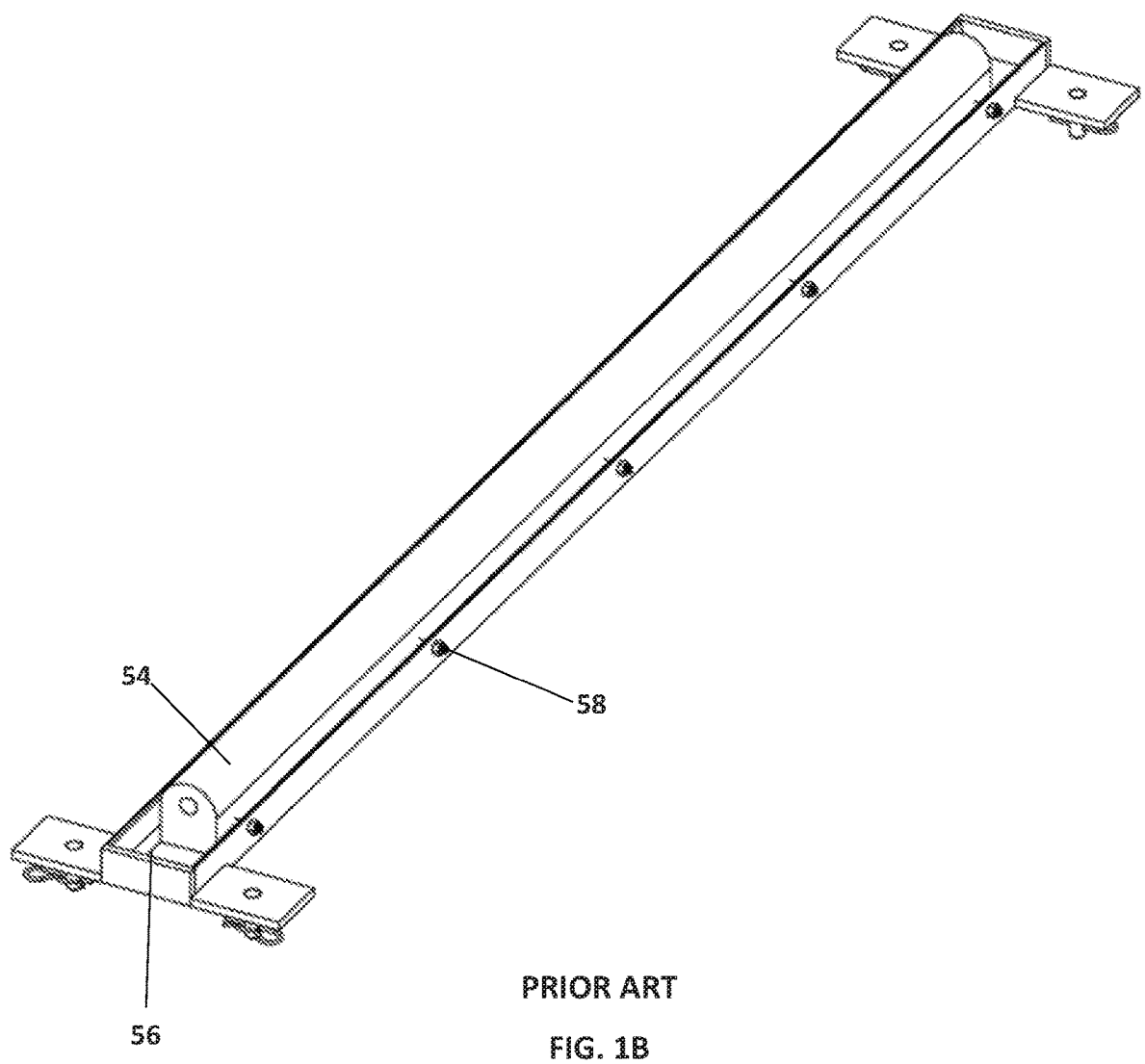
FIG. 1B illustrates a perspective view of a bumper separated from the prior art crane mat (as shown in FIG. 1A).
Figure 1C:
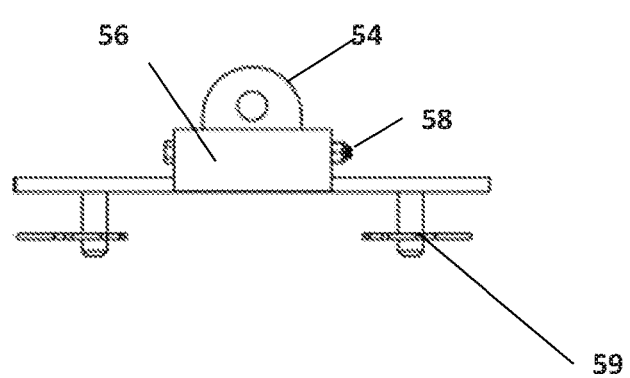
FIG. 1C illustrates a side view of the bumper (as shown in FIG. 1B).

FIG. 1A illustrates an embodiment of a prior art crane mat 50. As shown, the crane mat 50 includes a platform 52 and one or more bumpers 54 secured within a holder 56. The holder 56 including bumper 54 is removable from the platform 52. As shown in FIG. 1B, hardware such as nuts/bolts 58 secure the bumper 54 within the holder 56. As shown in FIG. 1C, hardware such as pin/cotter pins 59 are used to secure the holder 56 to platform 52. Typically, the holders 56 are separated from the platform 52 prior to stabilizing a crane.

Often times, two or more crane mats are stacked upon one another, for example, when storing or transporting the mats. Two or more crane mats are stacked upon one another so that the bottom of one crane mat rests upon the bumpers of another crane mat. The bumpers not only prevent crane mats from being directly stacked upon one another, but also creates a space between stacked mats, which is configured for receiving forks of a forklift machine to lift and move one or more mats from the stack. In order to move a stack of crane mats, a forklift operator positions cribbing under or beneath the bottom mat of the load of stacked crane mats. However, this may damage the load itself or the forks of the forklift machine.

The invention is directed to a device that organizes and stores a plurality of crane mats while minimizing damage to the load or forklift machine and maximizing safety during transport.

Figure 2A:
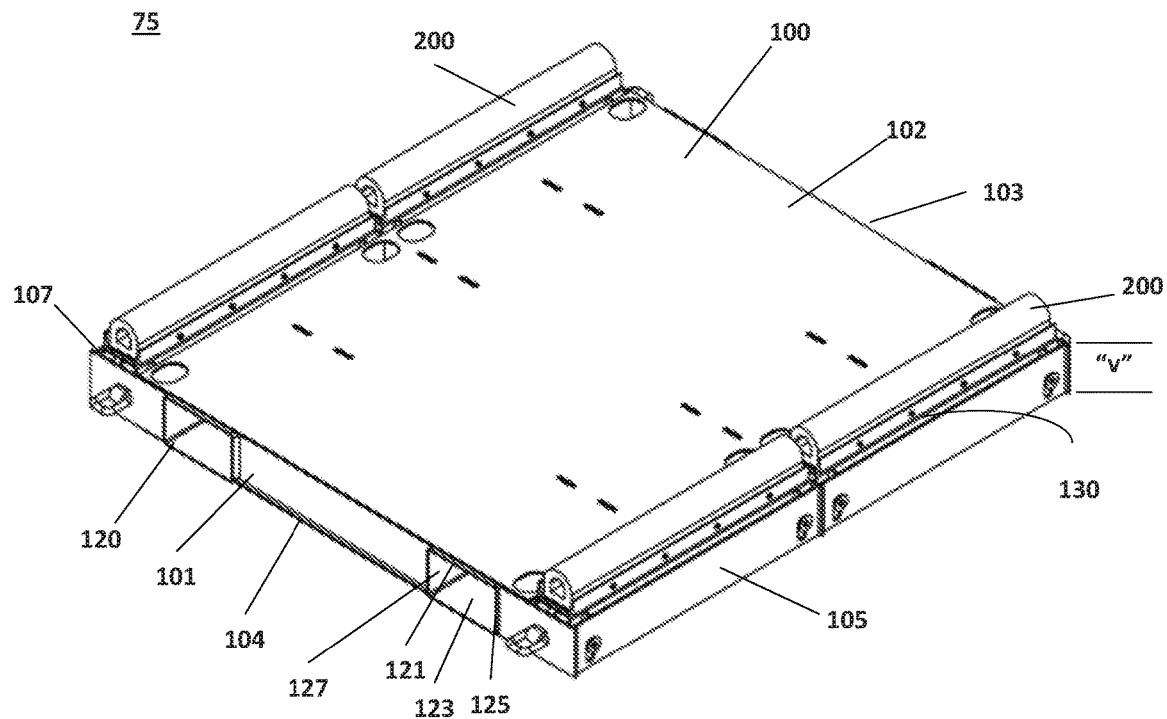
FIG. 2A illustrates a perspective view of an embodiment of a crane mat stand device according to the invention.
Figure 2B:
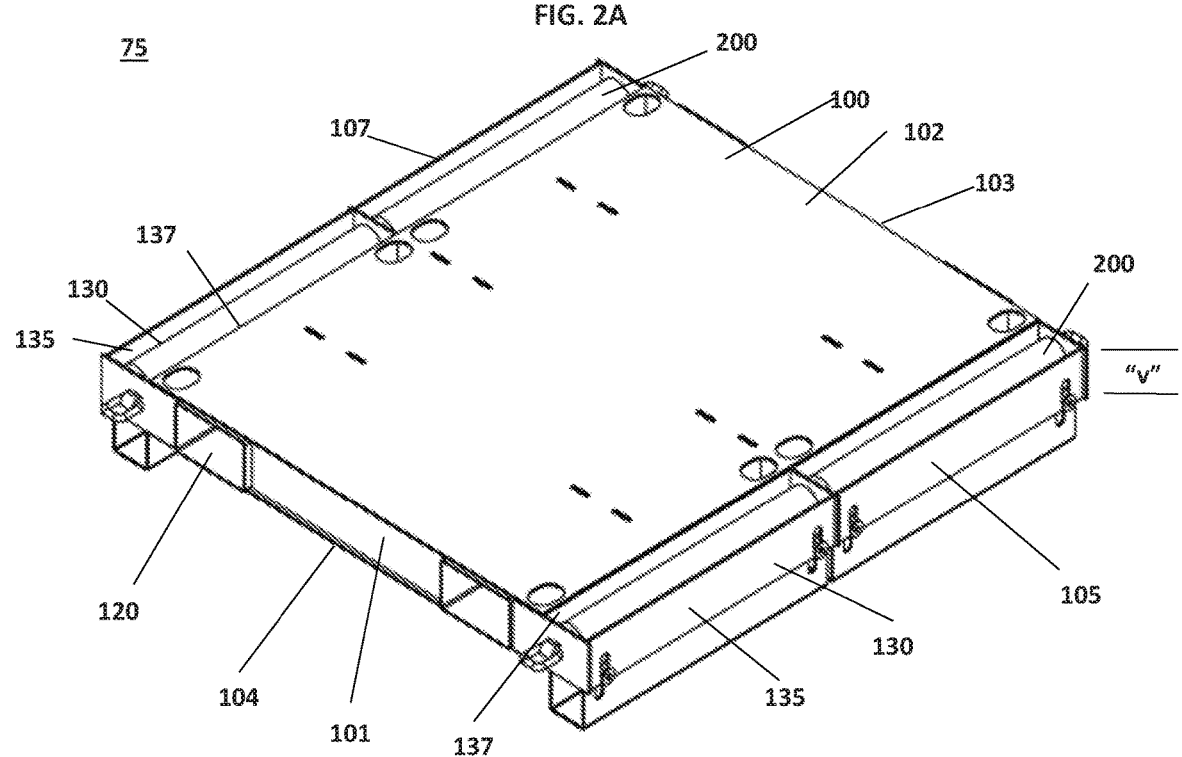
FIG. 2B illustrates another perspective view of the crane mat stand device according to the invention.

FIG. 2A and FIG. 2B each illustrate perspective views of an embodiment of a crane mat stand device 75 according to the invention. The crane mat stand device 75 comprises a base component 100 integrated with two or more support components 200. The support components 200 are moveable between a first position (otherwise referred to as a "resting position") shown in FIG. 2A and a second position (otherwise referred to as a "lifted position") shown in FIG. 2B.

The base component 100 may be fabricated from any material or combination of materials, such as metal, steel, rubber, wood, plastic, or aluminum, to name a few. The material may be strong, light-weight, and/or rust resistant.

The base component 100 is defined by a planar top surface 102 separated by a distance from a planar bottom surface 104. The top surface 102 is that on which one or more crane mats are positioned and the bottom surface 104 is that which is configured to rest on a ground surface.

The distance separating the top surface 102 from the bottom surface 104 defines the vertical height "V" of the device 75. The base component 100 further comprises a front side surface 101, a rear side surface 103 and a first side surface 105, and a second side surface 107.

Channel elements 120 and compartment elements 130 reside between the top surface 102 and bottom surface 104. As shown more specifically in FIG. 2A, channel elements 120 are openings that extend through the base component 100 from the front side surface 101 to the rear side surface 103. Each channel element 120 is defined by a top wall 121, a bottom wall 123, and two side walls 125, 127. The channel elements 120 are configured to receive forks of a forklift machine to lift the crane mat stand device (with or without a load).

As shown more specifically in FIG. 2B, compartment elements 130 are openings that extend through the base component 100 from the top surface 102 to the bottom surface 104.

Each compartment element 130 is defined by vertical border walls 135, 137. In certain embodiments, it is contemplated that the side surfaces 105, 107 of the base component 100 may further function as one or more of the border walls 135, 137 of the compartment element 130.

The compartment elements 130 are not bound by either a top wall or bottom wall so that the support component 200 can vertically move between a first position and a second position. The first position of the support component 200 is shown in FIG. 2A. A top portion of the support component 200 is positioned above the top surface 102 in a first position. As shown in FIG. 2B, a bottom portion of the support component 200 is positioned below the bottom surface 104 in a second position. The second position is achieved when the crane mat stand device 75 is picked up with a forklift machine, i.e., the support components 200 move vertically within the compartment elements 130 such that the weight of the load transfers from the support components 200 to the top surface 102 of the base component 100.

Although two compartment elements 130 are shown that are configured in parallel and each located near a side surface 105, 107 of the base component 100, any configuration and location of the compartment elements 130 is contemplated.

Figure 3A:
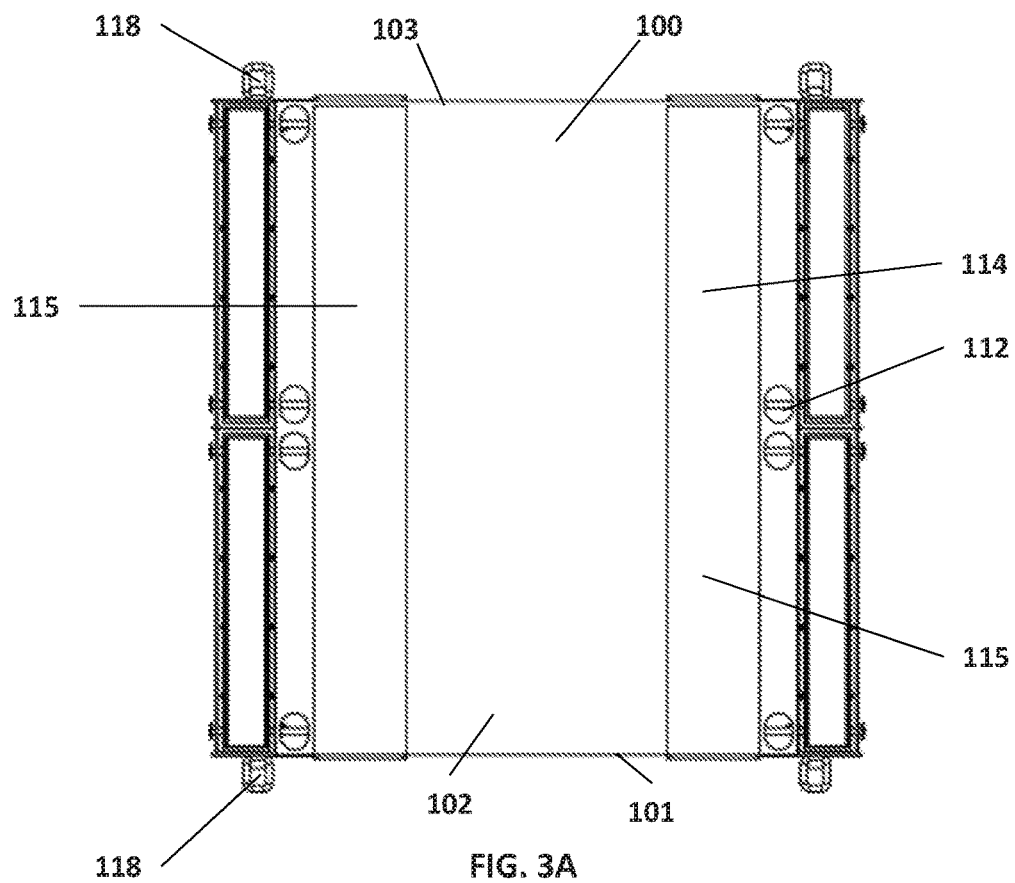
FIG. 3A illustrates a top view of another embodiment of a crane mat stand device according to the invention.
Figure 3B:
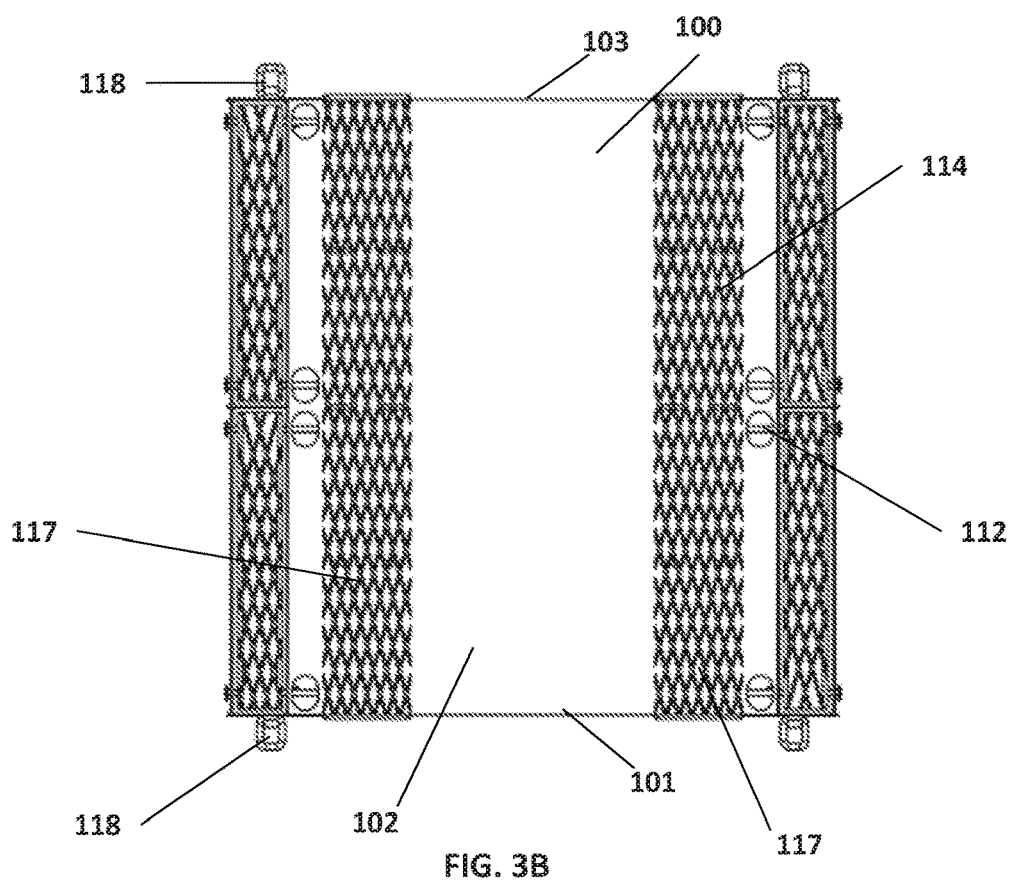
FIG. 3B illustrates a top view of yet another embodiment of a crane mat stand device according to the invention.

As seen, also, in FIG. 3A and FIG. 3B, the base component 100 may further include aperture elements 112, traction elements 114, and securing elements 118.

The crane mat stand device may include one or more aperture elements 112 located on the top surface 102, the bottom surface 104, or both surfaces 102, 104 of the base component 100. Each aperture element 112 is configured to drain materials (e.g., liquid) from the top surface 102. This prevents damage to the base component 100 and to the crane mat that is positioned on the top surface 102. The aperture elements 112 further permit access to the elements of the support components 200 in the event of replacement or repair. Any size, shape, configuration, or number of aperture elements 112 is contemplated.

Traction elements 114 may be located on the top surface 102, the bottom surface 104, or both. The traction elements 114 are contemplated to grip and minimize slipping of the crane mat load during storage and transport and may be constructed of any material such as foam, rubber, polyuria, metal mesh, etc. As shown in FIG. 3A, the traction element 114 is in the form of two rubber strips 115 that each cover a portion of the top surface 102. As shown in FIG. 3B, the traction element 114 is in the form of two steel mesh strips 117. Although the traction elements 114 are shown in both FIG. 3A and FIG. 3B as two rectangular strips that extend between the front side surface 101 and rear side surface 103, any size, shape, configuration, or number of traction elements 114 is contemplated.

The crane mat stand device 75 may further include securing elements 118 configured as lashing or tie down points. As shown in FIG. 3A and FIG. 3B, securing elements 118 may be located on the front side surface 101 and rear side surface 103. Types of securing elements 118 may include rings (e.g., hoist ring, D-ring), such as those configured to cooperate with tie down straps or hooks. Securing elements 118 may also include a rod or a chain. The securing elements 118 may be used by a crane machine or forklift machine to move or secure the position of the crane mat. Any type, size, configuration, or number of securing elements 118 is contemplated.

FIG. 4A—FIG. 4D each illustrate a perspective view of different contemplated embodiments of a support component 200 according to the invention. The support components 200 are each positioned and secured within the compartment elements 130 of the base component 100. Each support component 200 comprises a housing element 210 and a bolster element 230. Housing elements 210 may be fabricated from the same or different material than the base component 100, and are configured to cooperate with the bolster element 230. The bolster element 230 may be fabricated from any material, for example rubber, metal, wood, plastic, that provides a friction force between the bolster element 230 and a surface of a crane mat that is positioned on the crane mat stand device.

Figure 4A:
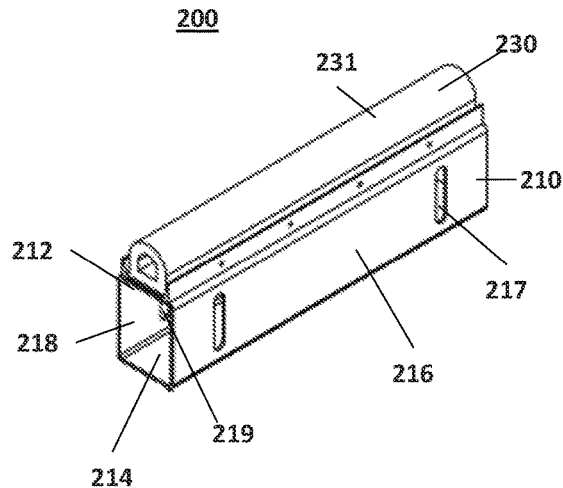
FIG. 4A illustrates a perspective view of one embodiment of a support component according to the invention.

As shown in FIG. 4A, housing element 210 includes a top boundary surface 212, a bottom boundary surface 214, a first side boundary surface 216 and a second side boundary surface 218. As shown in FIG. 4A—FIG. 4D, slot portions 217 are included on the first side boundary surface 216 and slot portions 219 are included on the second side boundary surface 218.

Figure 4B:
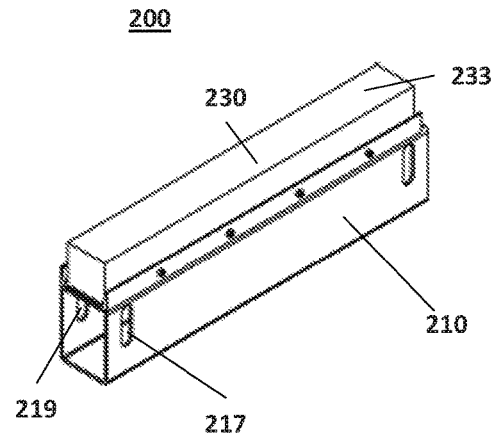
FIG. 4B illustrates a perspective view of another embodiment of a support component according to the invention.
Figure 4C:
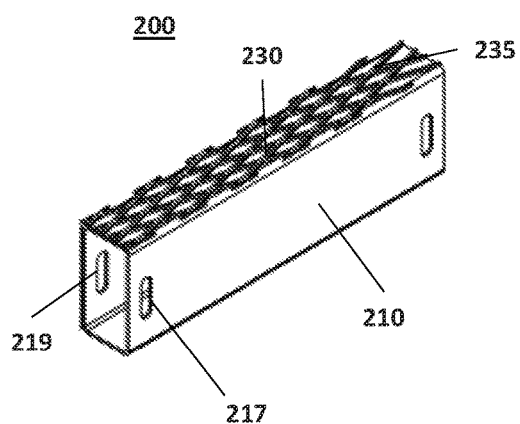
FIG. 4C illustrates a perspective view of another embodiment of a support component according to the invention.
Figure 4D:
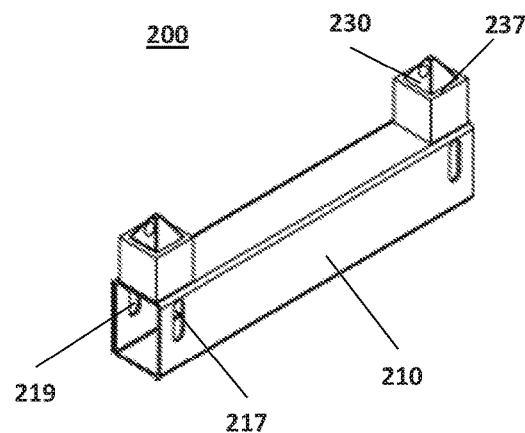
FIG. 4D illustrates a perspective view of another embodiment of a support component according to the invention.

As shown in FIG. 4A, bolster element 230 is in the form of a rubber pad 231 attached to the top boundary surface 212 of the housing element 210. As shown in FIG. 4B, bolster element 230 is in the form of a wood block 233 attached to the top boundary surface 212 of the housing element 210. As shown in FIG. 4C, bolster element 230 is in the form of a metal mesh 235 integrated into the top boundary surface 212 of the housing element 210. As shown in FIG. 4D, bolster element 230 is in the form of a stacking pin 237 attached to the top boundary surface 212 of the housing element 210. In addition to creating a friction force, the bolster elements 230 may also be used by the operator as a visual guide for placing a crane mat on the stand device 75.

Figure 5A:
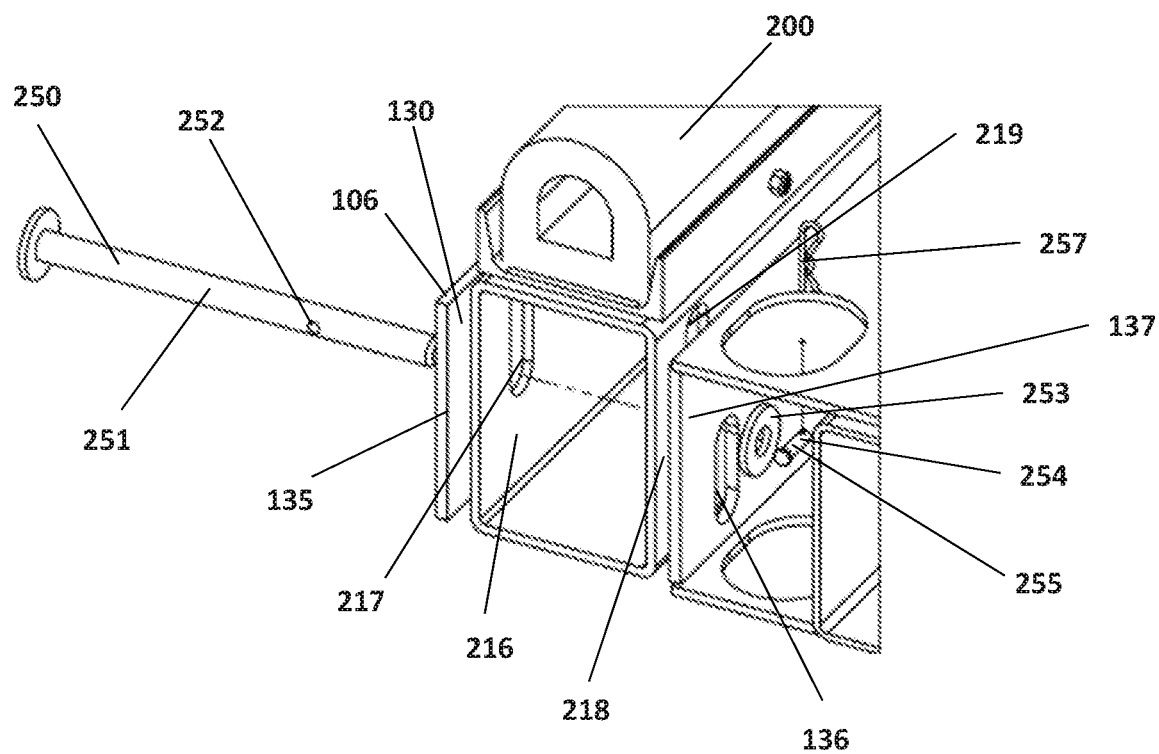
FIG. 5A illustrates a perspective sectional view of a support component attached within a compartment element according to the invention.
Figure 5B:
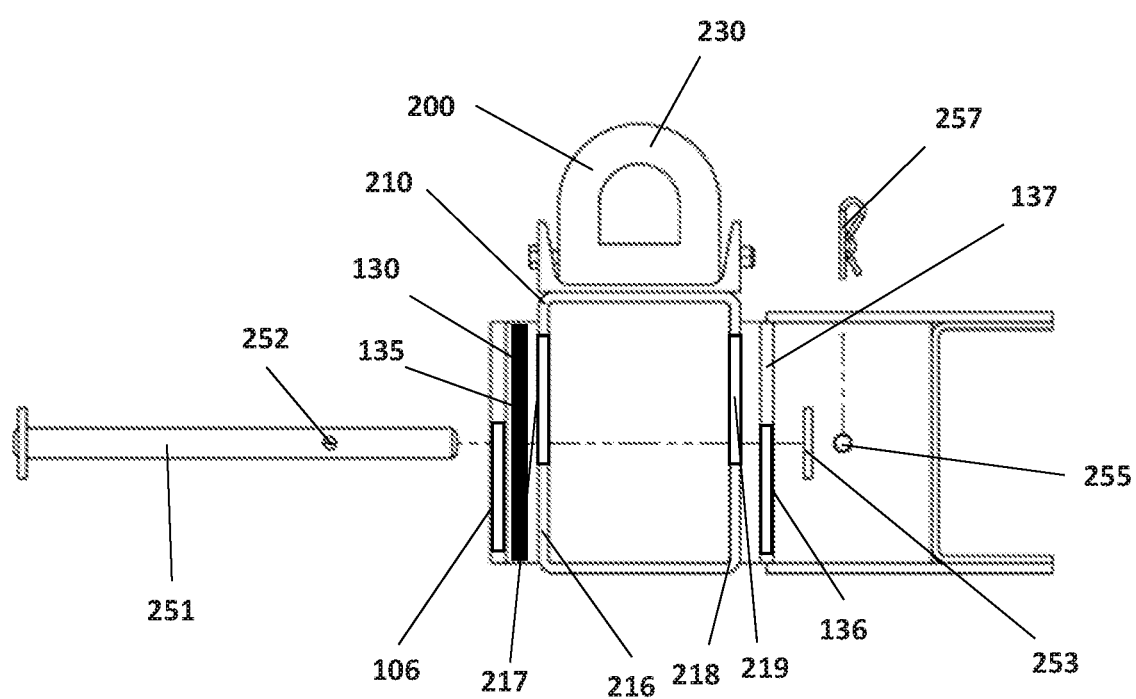
FIG. 5B illustrates a side sectional view of a support component attached within a compartment element according to the invention.

Each support component 200 is attached within the compartment element 130 as shown in FIG. 5A and FIG. 5B. As mentioned above, each compartment element 130 is defined by vertical border walls 135, 137, and it is contemplated that the side surfaces 105, 107 of the base component 100 may further function as one or more of the border walls 135, 137 of the compartment element 130.

As shown in FIG. 5A, the border wall 135 includes one or more first slit portions 106, and the border wall 137 includes one or more second slit portions 136. A first side boundary surface 216 of the support component 200 includes a first slot portion 217 and a second side boundary surface 218 of the support component 200 includes a second slot portion 219.

Hardware elements 250 are used to attach the support component 200 within the compartment element 130. More specifically, the support component 200 is positioned within the compartment element 130 such that all of the following are aligned: the first slit portion 106 of the first border wall 135 of the base component 100, the slot portion 217 of the first side boundary surface 216 of the support component 200, the slot portion 219 of the second side boundary surface 218 of the support component 200, and the second slit portion 136 of the first border wall 137. Once the slit portions 106, 136 and slot portions 217, 219 are aligned together, hardware elements 250 are used to attach the support component 200 within the compartment element 130.

As shown in FIG. 5A and FIG. 5B, hardware elements 250 include a first dowel pin 251, a washer 253, a second dowel pin 255, and a cotter pin 257, however, any hardware is contemplated, for example, nuts, bolts, screws, etc. First dowel pin 251 is inserted through slit portion 106, slot portion 217, slot portion 219, and slit portion 136. A washer 253 is located over the end of the first dowel pin 251 such that it substantially abuts the border wall 137. The first dowel pin 251 includes an aperture 252 through which the second dowel pin 255 is inserted. A cotter pin 257 is inserted into an aperture 254 of the second dowel pin 255.

Figure 6A:
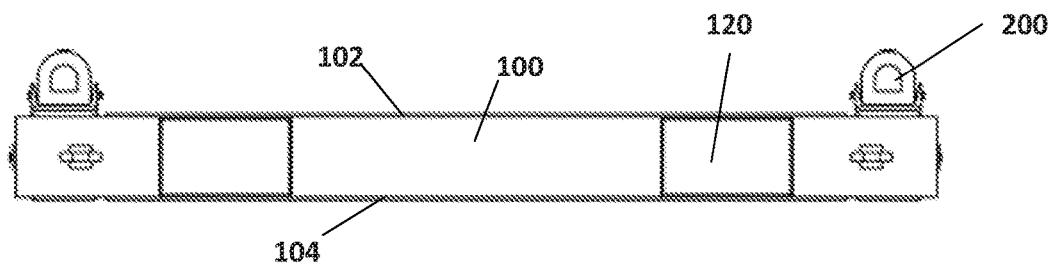
FIG. 6A illustrates a front view of the crane mat stand device in a first position according to the invention.
Figure 6B:
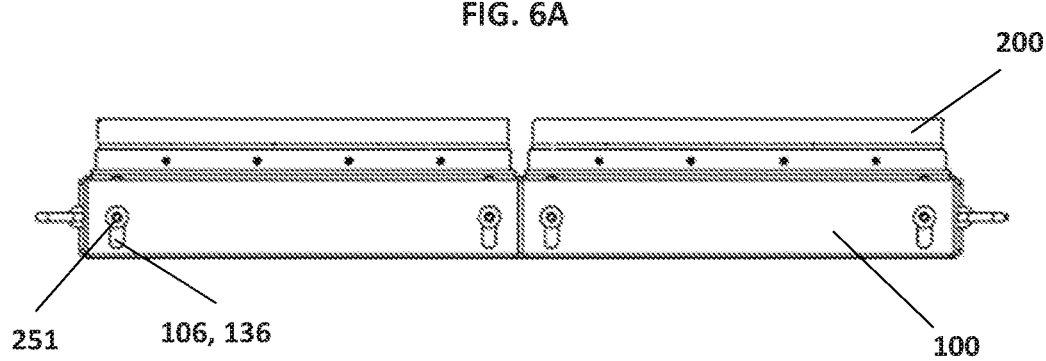
FIG. 6B illustrates a side view of the crane mat stand device in a first position according to the invention.
Figure 7A:
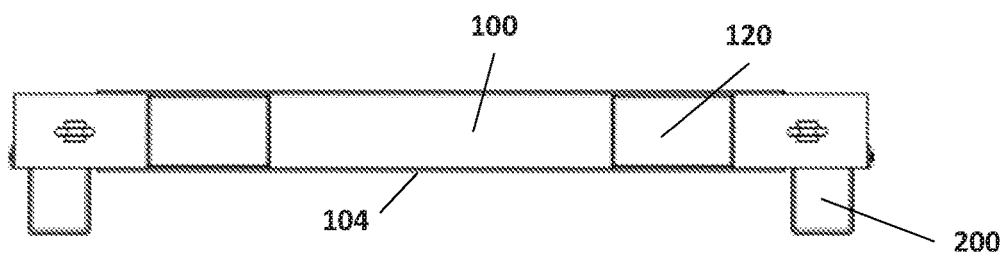
FIG. 7A illustrates a front view of the crane mat stand device in a second position according to the invention.
Figure 7B:
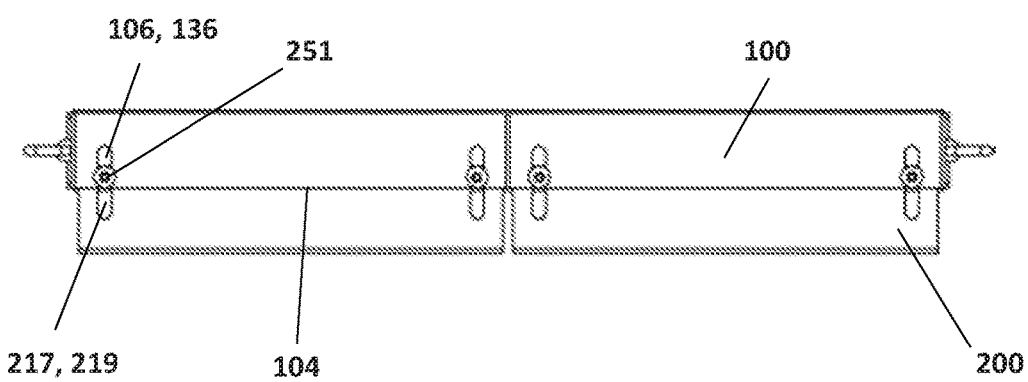
FIG. 7B illustrates a side view of the crane mat stand device in a second position according to the invention.

The support components move in the vertical direction between a first position shown in FIG. 6A and FIG. 6B and a second position shown in FIG. 7A and FIG. 7B. In both positions, the support components 200 extend beyond or protrude from the surfaces of the base component 100. The crane mat stand device 75 is in a resting position when the bottom surface 104 is located on a ground surface. As shown in the resting position of FIG. 6A and FIG. 6B, a top portion of the support components 200 extend beyond the top surface 102. The first dowel pin 251 is positioned such that it is near the bottom of the slot portions 217, 219 of the support component 200 and near the top of the slit portions, 106, 136 of the base component 100.

When the crane mat stand device 75 is lifted from the ground surface, e.g., inserting forks of a forklift machine within the channel elements 120, gravity causes the weight of the load to move the support components 200. The support components 200 travel vertically within the compartment elements 130 such that a portion extends beyond the bottom surface 104 as shown in the lifted position of FIG. 7A and FIG. 7B. In the lifted position, the first dowel pin 251 is located near the top of the slot portions 217, 219 of the support component 200 and near the bottom of the slit portions, 106, 136 of the base component 100. Advantageously, cooperation between the dowel pin 251 and both the slot portions 217, 219 and slit portions 106, 136 provide for travel of the support elements up to and including a maximum of 5 inches. However, any distance of travel is contemplated.

The crane mat stand device 75 returns to the resting position once the crane mat stand device 75 is positioned on a ground surface. The support components 200 travel vertically within the compartment elements 130 such that a portion extends beyond the top surface 102 of the base component 100 as shown in the resting position of FIG. 6A and FIG. 6B.

Figure 8A:
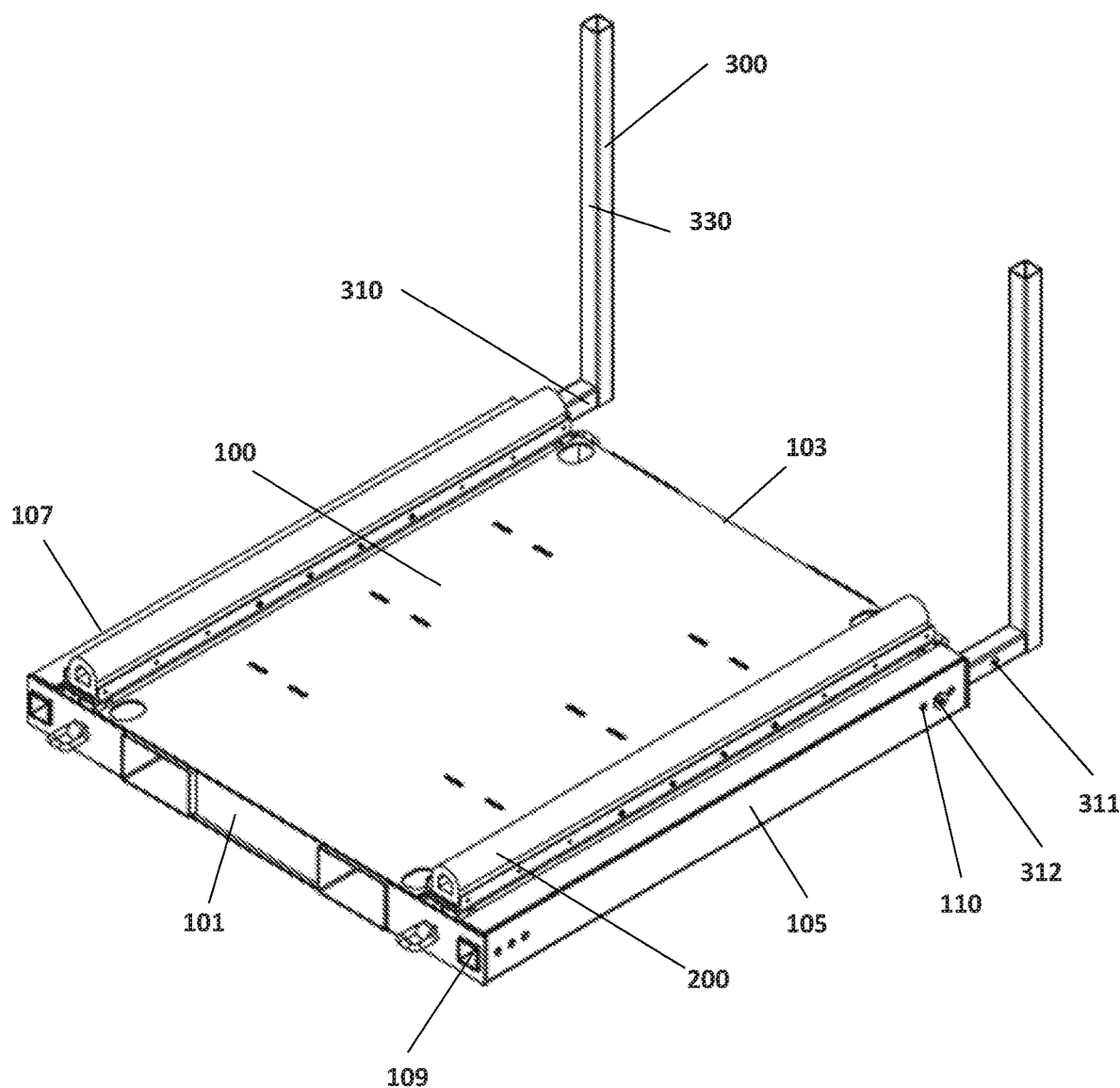
FIG. 8A illustrates a perspective view of guide components according to an embodiment of the invention.
Figure 8B:
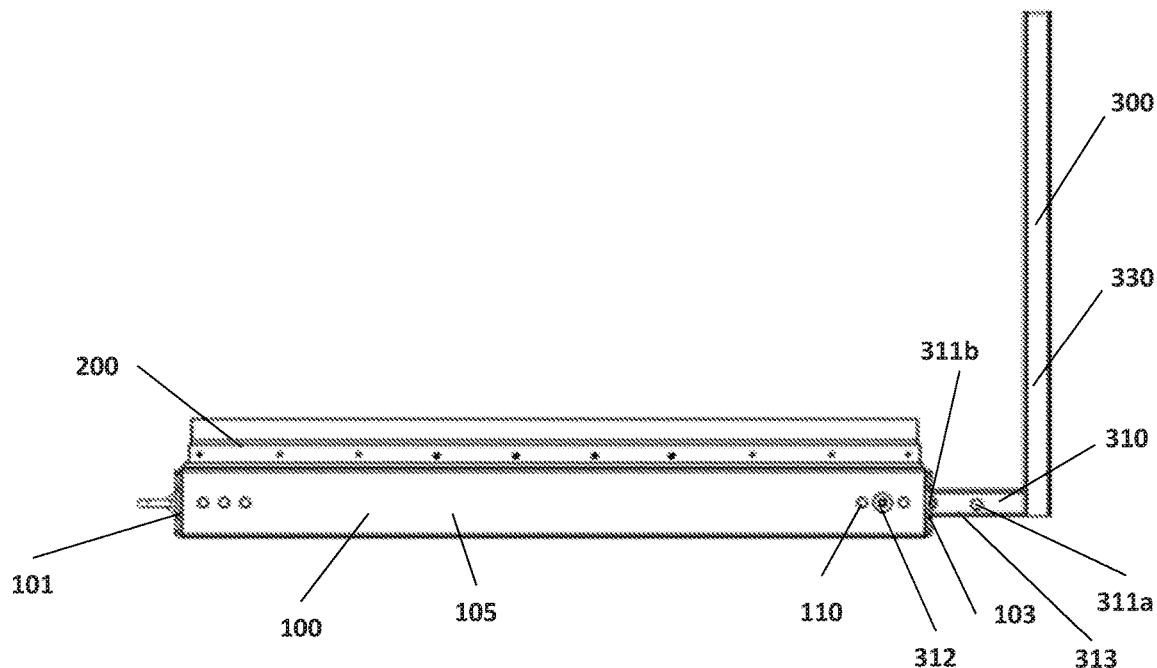
FIG. 8B illustrates a side view of guide components according to an embodiment of the invention.
Figure 8C:
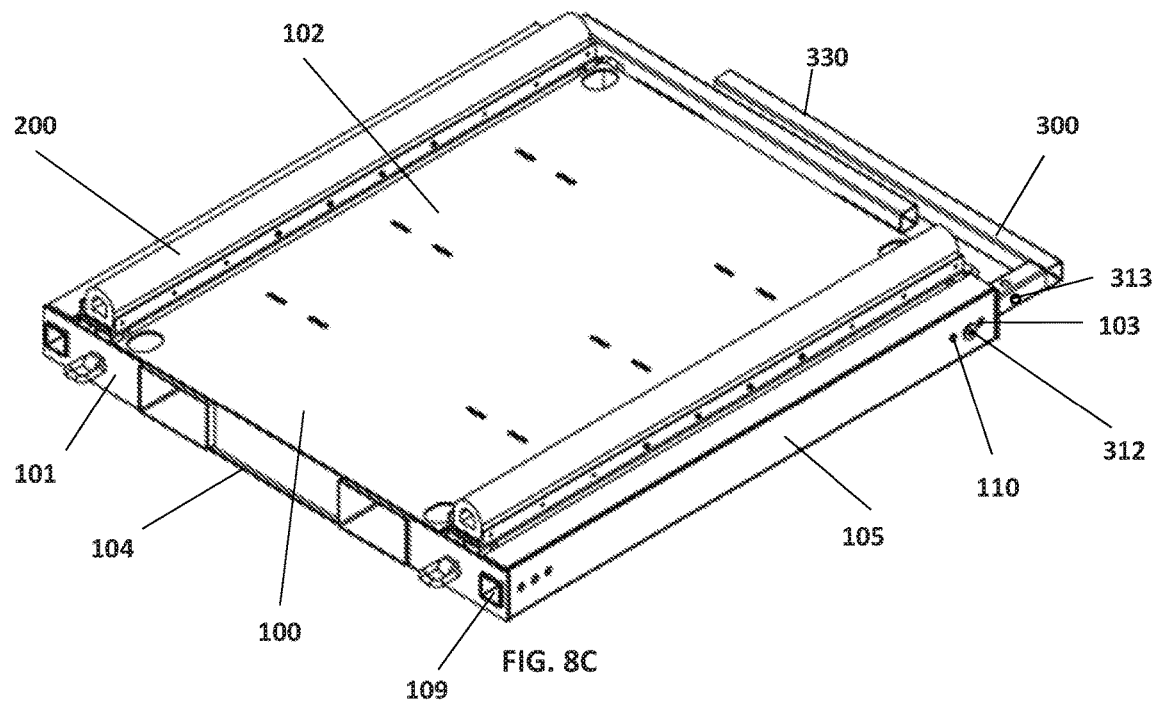
FIG. 8C illustrates another perspective view of guide components according to an embodiment of the invention.

In certain embodiments of the invention, backstop components 300 are contemplated. The backstop components 300 assist an operator with aligning the crane mats when placing them on the crane mat stand device 75. As shown in FIG. 8A—FIG. 8C, backstop components 300 extend from the rear side surface 103, however it is contemplated that they may extend from the front side surface 101, or both surfaces. The backstop components may also be broken down in a collapsed state as shown in FIG. 8C so that they are not a hinderance when transporting the crane mat stand device 75.

The backstop components 300 comprise a horizontal member 310 and a vertical member 330 forming an L-shaped configuration. The horizontal member 310 includes one or more hole elements 311. The horizontal member 310 is positioned within a conduit element 109 of the base component 100 as shown in FIG. 8A and FIG. 8C. Conduit elements 109 reside between the top surface 102 and bottom surface 104 of the base element 100. As shown more specifically in FIG. 8A, conduit elements 109 are openings that extend through the base component 100 from the front side surface 101 to the rear side surface 103. The conduit elements 109 are configured to receive the backstop component 300, and more specifically the horizontal member 310 of the backstop component 300.

The backstop component 300 is secured into place using a pin 312 that is directed through both hole elements 311 of the horizontal member 310 and the aperture elements 110 of the first side surface 105, or second side surface 107. The horizontal member 310 may further include additional hole elements 313 that may be used to secure the backstop component 300 in the collapsed state as shown in FIG. 8C. As shown in the collapsed state, the vertical member 330 is parallel to the top surface 102 and the bottom surface 104 of the base component 100.

It is contemplated that the distance of the vertical member 330 of the backstop component 300 from the base component 100 is adjustable through the use of a plurality of hole elements 311 located on the horizontal member 310. For example, the distance of the backstop components 300 from the base component 100 can be a short distance by utilizing one hole element 311a or a greater distance by utilizing a different hole element 311b as shown in FIG. 8B.

Figure 9A:
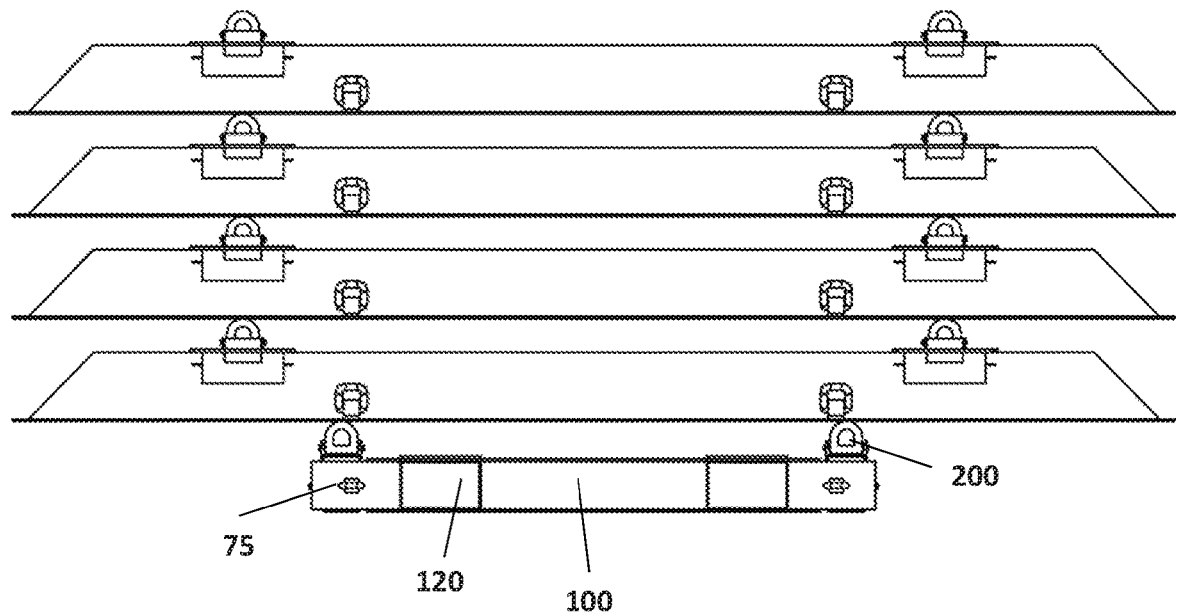
FIG. 9A illustrates a crane mat stand device according to the invention loaded with a plurality of crane mats in a first position.
Figure 9B:
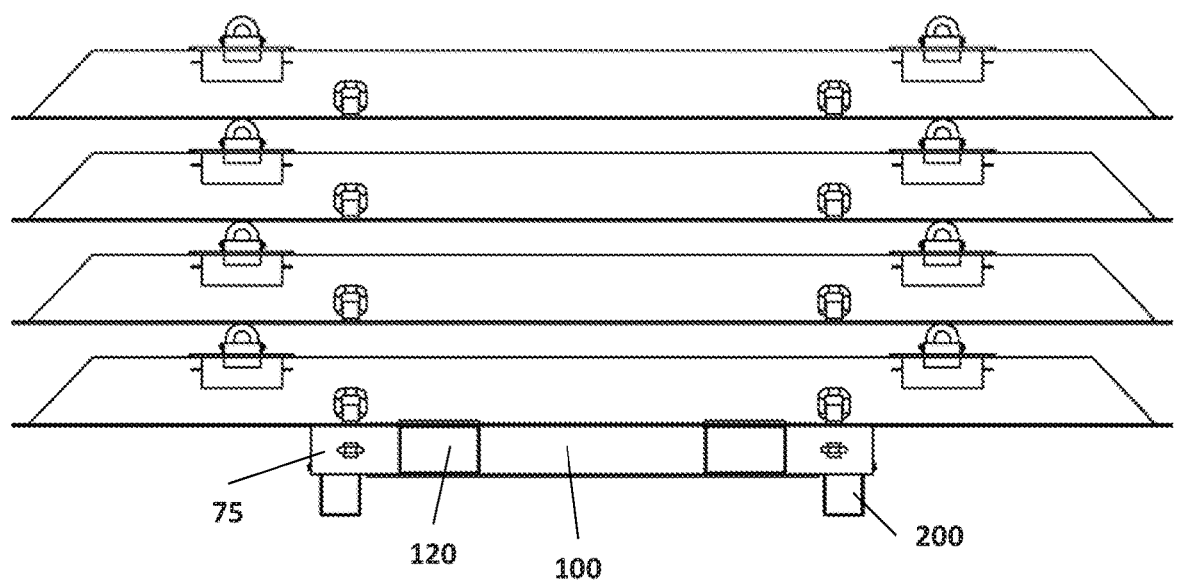
FIG. 9B illustrates a crane mat stand device according to the invention loaded with a plurality of crane mats in a second position.

FIG. 9A and FIG. 9B illustrate a crane mat stand device 75 according to the invention loaded with a plurality of crane mats. As shown in FIG. 9A, the base component 100 of the crane mat stand device 75 is located on a ground surface. The support components 200 are in a first position such that a portion protrudes from the top surface of the device 75. In this position, the support components 200 support the load. An operator positions the forks of a forklift machine within the channel elements 120 to lift the loaded crane mat stand device 75. As shown in FIG. 9B, when the device 75 is lifted, the weight of the load causes the support component 200 to move vertically downward. In this position a portion of the support component 200 protrudes from the bottom surface. This allows the crane mat load to transfer from the support components 200 directly to the top surface of the device 75 and furthermore to the forks of the forklift machine. Once the crane mat stand device 75 is positioned back on to a ground surface, the support components 200 travel vertically upward from the second position to the first position such that a portion of the support components 200 protrude from the top surface as shown in FIG. 9A.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A crane mat stand device comprising:
a base component including a top surface and a bottom surface; and
a support component, wherein the support component is secured within the base component, and the support component configured to assume a first position when the crane mat stand device is positioned on a ground surface and to assume a second position when the crane mat stand device is positioned off the ground surface,
in the first position, a top portion of the support component protrudes from the top surface of the base component, the top portion of the support component configured to support a load on the crane mat stand device, and
in the second position, a bottom portion of the support component protrudes from the bottom surface of the base component, wherein the load is transferred from the support component to the top surface of the base component as the support component travels by gravity vertically from the first position and the second position.

2. The crane mat stand device of claim 1 further comprising a channel element located between the top surface and the bottom surface of the base component, the channel element comprising an opening that extends through the base component from a front side surface to a rear side surface of the base component.

3. The crane mat stand device of claim 1 further comprising a compartment element located between the top surface and the bottom surface of the base component, the compartment element comprising an opening that extends through the top surface to the bottom surface of the base component.

4. The crane mat stand device of claim 1, wherein the support component further comprises a housing element and a bolster element, wherein the bolster element is secured to or integrated with the housing element.

5. The crane mat stand device of claim 4, wherein the bolster element is one or more selected from the group comprising: a rubber pad, a wood block, a metal mesh, a stacking pin.

6. The crane mat stand device of claim 1 further comprising one or more aperture elements located on the top surface of the base component.

7. The crane mat stand device of claim 1 further comprising traction elements located on the top surface of the base component.

8. The crane mat stand device of claim 7, wherein the traction elements is one or more selected from the group of: a rubber strip and a steel mesh strip.

9. The crane mat stand device of claim 2 further comprising securing elements located on one or more of the front side surface and the rear side surface of the base component.

10. The crane mat stand device of claim 9, wherein the securing element is a D-ring.

11. The crane mat stand device of claim 1 further comprising a conduit element located between the top surface and the bottom surface of the base component.

12. The crane mat stand device of claim 11 further comprising a backstop component, wherein the backstop component include a horizontal member and a vertical member forming an L-shaped configuration, and the horizontal member is configured to be positioned within the conduit element.

13. A crane mat stand device comprising:
a base component including a top surface and a bottom surface;
a support component including a housing element and a bolster element, wherein the bolster element is secured to or integrated with the housing element, the support component secured within the base component;
a channel element located between the top surface and the bottom surface of the base component, the channel element comprising an opening that extends through the base component from a front side surface to a rear side surface of the base component;
a compartment element located between the top surface and the bottom surface of the base component, the compartment element comprising an opening that extends through the top surface to the bottom surface of the base component; and the support component configured to travel vertically within the compartment element between a first position and a second position, in the first position the crane mat stand device is positioned on a around surface, the bolster element of the support component protrudes from the top surface of the base component, the support component is configured to support a load, and in the second position the crane mat stand device is positioned off the ground surface, the housing element of the support component protrudes from the bottom surface of the base component, wherein the load transfers from the support component to the top surface of the base component as the support component travels from the first position to the second position.

14. The crane mat stand device of claim 13, wherein the bolster element of the support component does not protrude from the top surface of the base component in the second position.

15. The crane mat stand device of claim 13 further comprising one or more aperture elements located on the top surface of the base component.

16. The crane mat stand device of claim 13 further comprising traction elements located on the top surface of the base component.

17. The crane mat stand device of claim 13 further comprising securing elements located on one or more of the front side surface and the rear side surface of the base component.

18. The crane mat stand device of claim 13 further comprising a backstop component extending from one of the front side surface and the rear side surface of the base component.

19. The crane mat stand device of claim 18, wherein the backstop component includes a horizontal member and a vertical member forming an L-shaped configuration.

20. The crane mat stand device of claim 19, wherein the backstop component is configured to achieve a broken down state in which the vertical member parallel to the top surface and the bottom surface of the base component.

* * * * *